Patented June 10, 1930

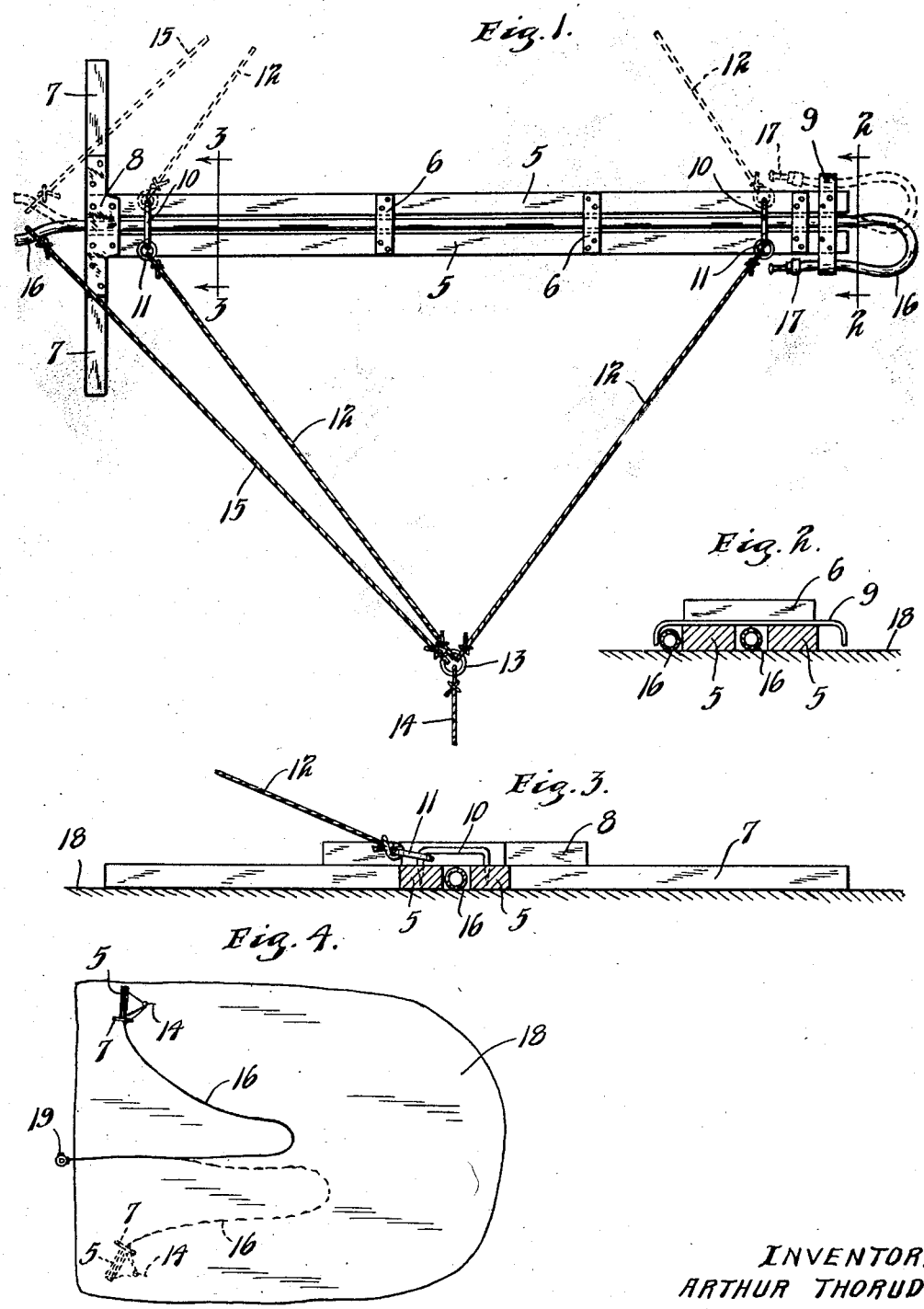

1,762,599

UNITED STATES PATENT OFFICE

ARTHUR THORUD, OF MINNEAPOLIS, MINNESOTA

COMBINED SPRINKLER AND SURFACER FOR ICE RINKS

Application filed March 16, 1929. Serial No. 347,544.

This invention relates to a combined sprinkler and surfacer for ice rinks.

After ice has been skated on for some time, the ice will become cut up or cracked by continued freezing, and in order that a smooth surface may be provided for the use of skaters, it is desirable to sprinkle and re-surface the ice.

It is the object of the present invention to provide a novel and improved combined sprinkler and surfacer for ice rinks, which, while being used, will clear off any loose ice or snow, which may have accumulated on the ice and which will act to cause water to be spread evenly over the entire surface of the ice.

It is a further object of the invention to provide such a combined sprinkler and surfacer, which can be reversed in its direction of operation without necessitating the change of the main portion of the hose, or other water supply, during the entire time that a whole ice rink is being sprinkled and surfaced, thereby permitting the work to be done very quickly and with little labor.

To these ends, the invention consists in the novel parts and novel combinations of parts, hereinafter defined in the claims and described in the following specification, made in connection with the accompanying drawings, wherein like reference characters refer to the same or similar parts throughout the various views, and, in which—

Fig. 1 is a plan view illustrating the combined sprinkler and surfacer in position for use with the hose attached thereto, certain of the parts being illustrated in full lines in one position and in dotted lines in another position;

Fig. 2 is a vertical section taken on the line 2—2 of Fig. 1, as indicated by the arrows;

Fig. 3 is a vertical section taken on the line 3—3 of Fig. 1, as indicated by the arrows; and Fig. 4 is a view illustrating an ice rink with the device of the present invention in working position on the rink and illustrating the manner in which the device is used.

In accordance with the present invention, a pair of long bars 5 are provided and these bars are held together in closely spaced parallel relationship by means of cleats 6 secured to the upper edges of the bars at spaced intervals thereon. An arm 7 is secured to what may be termed the inner end of each bar 5 and projects forwardly or rearwardly from its respective bar at a right angle thereto, to form with its bar what may be termed an angular corner. A plate 8 secured to the two arms 7 is also secured to the two inner ends of the upper edges of the bars 5, to brace the arms and hold them securely in place on the bars 5. A hose holder 9 is secured to the two outer ends of the bars 5, and this hose holder may consist merely of a section of strap iron extending transversely between the outer ends of the bars 5, and projecting forwardly and rearwardly therefrom for short distances and bent downwardly at its forward and rear ends. Wide staples 10 carrying rings 11 are secured to the two bars 5 adjacent their inner and outer ends, and ropes or cables 12 are tied at their rear ends to the two rings 11 and are secured at their forward ends to a single ring 13 to which a pull rope 14 is also secured. Another rope 15, which will be designated the hose rope, is secured at its forward end to the ring 13.

The device is used in combination with a flexible hose, such as the hose 16, of the common garden type. The outer portion of the hose 16 is run between the two bars 5 beneath the plate 8 and cleats 6, and the central portion of the hose holder 9. A nozzle 17 is preferably provided at the discharge end of the hose 16 and when in use, the outermost portion of the hose will be drawn outwardly a short distance from the outer ends of the bars 5 and reversely bent in the manner illustrated in Fig. 1, and the portion of the hose adjacent the nozzle 17 will be carried between a downwardly projecting portion of the hose holder 9, and the particular bar 5 which is to be first advanced over the ice. The nozzle 17 of the hose, when the hose is secured in this position, will project inwardly toward the corner formed by one of the arms 7 and one of the bars 5, and the nozzle will be so disposed that a stream of water discharged therefrom will run ahead of the first advancing bar 5 and substantially parallel thereto. The rear end of the hose rope 15 is secured to the hose 16 preferably a short distance inwardly from the inner ends of the bars 5.

To illustrate the use of the device, an ice rink 18 is shown in Fig. 4. A suitable source of water supply such as a water faucet 19 is shown at one end of the ice rink, and the inner end of the hose 16 is illustrated as being connected to the water supply faucet 19. Preparatory to using the device the hose 16 will be drawn outwardly on the center of the ice rink from the water supply faucet 19. For the first swath to be taken, the sprinkler and surfacer will be positioned at the outer edge of the rink adjacent to the faucet 19. The inner ends of the bars 5 will project inwardly toward the central portion of the rink, while the outer ends of the bars will project outwardly to points adjacent the edge of the ice. The ropes 12, 14 and 15, together with the ring 13 will be carried to one side of the two bars 5 ahead of what may now be termed the forward bar 5 for the first swath. Water may then be supplied from the faucet 19 to the hose 16, whereupon the device will be drawn by the rope 14 around the outer edge of the rink until the device has arrived at such a position as that indicated in dotted lines Fig. 4. The nozzle 17 of the hose will, of course, be situated ahead of the first advancing bar 5 for the first swath during this action and as the water is discharged from the nozzle 17, it will be carried on to the ice directly ahead of the first advancing bar 5 for the first swath and against the arm 7 secured to the said bar. Any loose snow or ice ahead of the bar 5 will be carried by the stream of water from the hose into the corner formed by an arm 7 and the first advancing bar 5 of the first swath, whereupon the loose snow and ice will be collected and retained in this corner as the device is advanced over the ice. The first advancing bar 5 will act to spread the water as discharged over the surface of the ice and as the portion of the hose extending between the two bars 5 rests directly on the ice, this portion of the hose will act as a flexible member conforming to the exact curvature of the ice and thereby spreading water over the entire surface of the ice included in the swath taken by the device irrespective of any unevenness or irregularities in the surface of the ice. When the device has reached the position illustrated in dotted lines Fig. 4, as the first swath has been completed ropes 12 and 15 will be carried from one side of the device to the other side thereof i. e. from the position illustrated in full lines Fig. 1 to the position illustrated in dotted lines Fig. 1. The position of the outer end of the hose 16 will also be changed from that indicated in full lines, Fig. 1, to that indicated in dotted lines Fig. 1, whereupon the whole device can be moved outwardly a distance equal to the length of the bars 5, and the device will then be ready to be used in making the second swath. The device will now be dragged in an opposite direction than formerly and the bar 5 which was the first advancing bar of the first swath will now be the last advancing bar of the second swath. When the direction of the device is reversed, any accumulation of loose snow and ice which may be formed in the corner, formed by an arm 7, and the first advancing bar 5 of the first swath will be dropped on the ice. Successive swaths can be taken in this manner until the whole rink has been sprinkled and surfaced. During this whole period of time, the main portion of the hose drawn out on the ice need not be changed and, accordingly, the whole rink can be quickly sprinkled and surfaced. The rope 15 attached to the hose 16 adjacent the inner ends of the bars 5, will act to prevent the hose from kinking during movement of the device and will also act to prevent the hose from pulling inwardly from between the two bars 5. The staples 10 will permit the rings 11 to be readily carried from one advancing bar 5 to the other advancing bar as the direction of movement of the device is changed.

The device has been amply demonstrated in actual practice and has been found to be successful for the purposes intended. It will spread water evenly over the ice of an ice rink to fill up all cracks and unevenness in the ice, to thereby permit the ice to freeze and form a smooth even surface.

It will, of course, be understood that various changes may be made in the form, details, arrangement and proportions of the various parts without departing from the scope of the present invention.

What is claimed:

1. A combined sprinkler and surfacer for ice rings, comprising a pair of spaced bars between which a hose is adapted to be run, said bars being adapted to rest on and be moved over the ice to surface the same, and means adapted to hold the discharge end of a hose directed inwardly from the outer end of one of said bars ahead of the same.

2. The combination with a flexible water hose, of a sprinkler and surfacer for ice rinks, comprising a pair of spaced bars adapted to rest on the ice and between which a portion of the hose extends, and a holder at one end of one of said bars for receiving and holding the discharge end of said hose to direct water therefrom ahead of and along one edge of the same, said bars and the portion of said hose extending between said bars acting to spread the water discharged from the hose evenly over the surface of the ice.

3. The combination with a hose, of a sprinkler and surfacer for ice rinks, comprising a pair of long bars held in spaced parallel relation, a portion of said hose running between said bars and said hose being reversely bent adjacent its discharge portion, a holder at the outer end of one of said bars for holding the discharge portion of said hose disposed ahead of one of said bars and directed substantially parallel to said bars, and means connected to said bars for dragging said bars and hose over the ice, said bars and hose acting to spread water discharged from said hose evenly over the surface of the ice.

4. A combined sprinkler and surfacer for ice rinks, comprising a pair of long bars held in spaced parallel relation and between which a hose is adapted to be run, an arm secured to the inner end of the forward bar and projecting at substantially a right angle therefrom, and a holder at the outer end of said forward bar for holding the discharge portion of a hose run between said bars in such position that as water is discharged from the hose, it will be directed in a stream substantially parallel to said bars ahead of said forward bar and against the angle formed by the forward bar and said arm.

5. The combination with a hose, of an ice sprinkler and surfacer, comprising a pair of long bars secured together in parallel spaced relationship, said bars being adapted to rest on the ice, said hose running between said bars and also being adapted to rest on the ice, a holder mounted on the outer ends of said bars for holding the discharge portion of said hose ahead of either one of said bars and directed substantially parallel to said bars to discharge a stream of water inwardly ahead of the advancing bar, an arm secured to the inner end of each of said bars and projecting at right angles therefrom, and a harness for pulling said device, whereby when said device is pulled over the ice, said bars and the portion of said hose running between said bars will act to spread water discharged from said hose evenly over the surface of the ice, and the stream of water from said hose will act to carry loose snow and ice ahead of the advancing bar into the angular corner formed between the advancing arm and the advancing bar.

6. The combination with a watering hose, of a sprinkler and surfacer for ice rinks, comprising a pair of long bars secured together in closely spaced, parallel relationship, said hose being adapted to be extended between said bars to the outer ends thereof, then being adapted to be reversely bent so that the discharge portion thereof projects inwardly ahead of one of said bars, a holder at the outer ends of said bars for holding the discharge portion of said hose ahead of either one of said bars, arms respectively secured to the inner ends of each of said bars and projecting at right angles therefrom, pull ropes secured to said bars adjacent their inner and outer ends, whereby said sprinkler and surfacer can be drawn over the ice first in one direction, and the hose will discharge water ahead of one of the bars and toward the angular corner formed by the same and the arm secured thereto, whereupon said sprinkler and surfacer can be dragged in an opposite direction to take a second swath over the ice and the outer end of said hose can be mounted ahead of the other of said bars, to permit the use of the device without moving the portion of the hose running from the sprinkler and surfacer to a water supply.

7. The structure defined in claim 6, a ring to which said ropes are secured and a third rope secured to said ring and said hose inwardly from the inner ends of said bars, to prevent the hose from kinking as it is drawn across the ice.

8. A combined sprinkler and surfacer for ice rinks, comprising a long bar adapted to rest on and be moved over the ice to surface the same, means for holding a hose stretched along the rear side of said bar and means at one end of the bar for holding the discharge end of the hose ahead of the bar and directed toward the other end of the bar.

In testimony whereof I affix my signature.

ARTHUR THORUD.